United States Patent [19]

Gilgien

[11] Patent Number: 4,934,509
[45] Date of Patent: Jun. 19, 1990

[54] DEVICE FOR TRANSFERRING PRODUCTS TRANSPORTED BY A CONVEYOR AND METHODS OF USING SAID DEVICE

[75] Inventor: Willy Gilgien, Apples, Switzerland

[73] Assignee: SAPAL—Societe Anonyme des Plieusus Automatiques, Switzerland

[21] Appl. No.: 269,909

[22] PCT Filed: Jan. 27, 1988

[86] PCT No.: PCT/CH88/00016
§ 371 Date: Sep. 27, 1988
§ 102(e) Date: Sep. 27, 1988

[87] PCT Pub. No.: WO88/05418
PCT Pub. Date: Jul. 28, 1988

[30] Foreign Application Priority Data

Jan. 27, 1987 [FR] France ................. 87 01039

[51] Int. Cl.$^5$ ............................................. B65G 43/00
[52] U.S. Cl. ....................... 198/460; 198/464.3; 198/570; 198/718
[58] Field of Search ................. 198/570, 572, 464.2, 198/718, 460, 459, 419, 464.3

[56] References Cited

U.S. PATENT DOCUMENTS

| | | | |
|---|---|---|---|
| 4,180,154 | 12/1979 | Andersson | 198/572 X |
| 4,195,723 | 4/1980 | Loewenthal | 198/461 |
| 4,375,845 | 3/1983 | Chambers et al. | 198/570 |
| 4,514,963 | 5/1985 | Bruno | 198/572 X |
| 4,569,181 | 2/1986 | Raudat | 198/570 X |
| 4,637,509 | 1/1987 | Raudat et al. | 198/461 X |
| 4,690,269 | 9/1987 | Takao | 198/461 X |
| 4,768,642 | 9/1988 | Hunter | 198/570 X |

Primary Examiner—Robert J. Spar
Assistant Examiner—James R. Bidwell

[57] ABSTRACT

A device for transferring product transported by an endless conveyor onto a receiving surface, the device includes two endless flexible members which each carry at least one pusher member for controlling the movement of product along the conveyor, sensors for sensing the arrival and the departure of product at the conveyor and the receiving surface, the sensors being connected with a control apparatus which is capable of independently actuating a drive mechanism, associated with each of the flexible members, so that the flexible members can be actuated independently to control the product transfer.

11 Claims, 3 Drawing Sheets

DEVICE FOR TRANSFERRING PRODUCTS TRANSPORTED BY A CONVEYOR AND METHODS OF USING SAID DEVICE

The present invention relates to a device for transferring products transported by an endless conveyor onto a receiving surface, said device comprising at least two pushers movable according to the direction of transport of the products on the conveyor, said pushers being respectively linked to two endless flexible members each forming a closed loop, and arranged for translational displacement while driving the pushers on at least one common rectilinear section.

It likewise relates to a method of using this device including at least two pushers movable according to the direction of transport of the products on the conveyor, said pushers being respectively linked to two endless flexible members each forming a closed loop, and arranged for translational displacement thereof while driving the pushers on at least one common rectilinear section.

Production lines and/or lines for conditioning products, notably for food products such as chocolate bars, coated product sticks or the like, often comprise one or several conveyors for bringing these products onto one or several receiving surfaces arranged to take up a series of these products for their transfer to a processing station, for example a packaging machine.

The passage from the conveyor for feeding to the receiving surface may be effected in different ways.

The first consists in projecting the products, that is to say, in utilizing the kinetic energy stored by the products transported by the conveyor to make them pass onto the receiving surface. This method is not suited to all products and often presents the drawback of disturbing the position of the products. The products delivered in rows are often misaligned.

The second method consists in driving the products by means of pushers which take up these products and guide them during their displacement. These pushers are in general associated with a transporter or an intermediate plate which stores the products at the exit of the conveyor before their transfer to the receiving surface. In practice, charging and discharging this intermediate transporter or this plate can not be effected simultaneously, so that a non-negligible loss of time is registered at the moment of passage of the products from the conveyor to the receiving surface, due to the fact that a series of products deposited on the intermediate support must first be discharged before a new series delivered by the conveyor may be deposited thereon. This constitutes a serious drawback because it causes a certain limitation of the speed on the line as a whole.

Moreover, one of the problems which arise in the case of conditioning lines is that of setting the pace of the individual products or rows of products. The products disposed for example on a conveyor belt must be positioned in such a manner that their relative spacing is regular. To this end, they must be decelerated or accelerated with respect to the band transporting them.

In certain installations, and for certain treated products, the problem is that of separating a group of products consisting of a fixed number of these products, from a set of products supplied in bulk by the conveyor. Such an installation is described in the French publication No. 2,259,750 and includes two circuits of synchronized registration arms which have the function of ensuring the separation and maintaining in place the groups composed for example of twelve boxes while they are set in place on a support brought by another way underneath these boxes.

This same problem of separating the products is illustrated by the British patent application published under No. 2,003,441 which descried an installation comprising two wheels with radial blades which act upon the products. In this case, the blades of the first wheel are synchronized with the rear of the products brought in contact with each other, and those of the second wheel have the object of accelerating the products so as to create a constant spacing between two successive products.

All of the known systems are applicable to rows of products in which the individual products are not perfectly aligned and to rows of products which are not necessarily equidistant.

It is proposed in the present invention to palliate the drawbacks mentioned above to ensure the passage of the products from the supply conveyor onto a receiving surface and to solve the problems of setting the pace of the products, or groups of products, by realizing in particular a device which permits simultaneous charging and discharging of an intermediate support, which allows to avoid a loss of time in waiting between those two steps of the process, and a device for guiding the products, or groups of products, during their transport or transfer.

To this end, the device according to the invention is characterized in that it comprises two independent drive mechanisms respectively coupled with said endless flexible members, control means for controlling said drive mechanisms and at least first detection means arranged to deliver a signal relating to the arrival of products or groups of products on said conveyor and second detection means arranged to deliver a signal relating to the departure of the products or groups of products from said receiving surface, said first and second detection means being coupled with said control means, and said control means being designed to actuate said drive mechanisms independently as a function of said signals, in such a manner that said pushers are actuated independently of each other as a function of the arrival and the departure of the products or groups of products respectively at the conveyor and the receiving surface.

Each endless flexible member advantageously carries two pushers, offset with respect to one another in the direction of their displacement and mounted transversely with respect to said members.

According to a preferred embodiment, each endless flexible member includes two chains or bands, the chains or bands of one of the endless flexible members being disposed in parallel position between the chains or bands of the other endless flexible member.

The two chains or bands of one of the endless flexible members are preferably connected to one another by two pushers parallel to one another and perpendicular to the longitudinal direction of the correspnding chains or bands, said pushers being axially offset with respect to one another, and the two chains or bands of the other endless flexible member are preferably likewise connected to one another by two transversal pushers, parallel to one another and perpendicular to the longitudinal direction of the corresponding chains or bands, said pushers being axially offset with respect to one another.

According to a particular embodiment, the chains or bands of one of the endless flexible members are tensioned between two first parallel axles and the chains or bands of the other endless flexible member are tensioned between two second parallel axles. The first axles may be parallel to the second ones or at least one of the first axles may be coaxial with one of the second axles.

According to a preferred embodiment, each endless flexible member includes a chain or band, these two bands being disposed parallel to one another, and each chain or band carries at least one pusher, the conveyor and at least the intermediate support being disposed in parallel position and laterally offset with respect to said chains or bands. The intermediate support is preferably a fixed platform.

According to another advantageous embodiment, the intermediate support is an endless belt conveyor. It may likewise consist of an end section of the conveyor.

The method of utilizing the device according to the invention is characterized in that one controls independently of one another the drive mechanismsof the two pushers movable as a function of signals transmitted to control means for controlling said drive mechanisms, said signals relating to the arrival of products or groups of products at the conveyor and/or to the departure of the preceding products at the receiving surface.

The present invention wil be better understood with reference to the description of an example of an embodiment and to the accompanying drawings, wherein.

Figure 11:
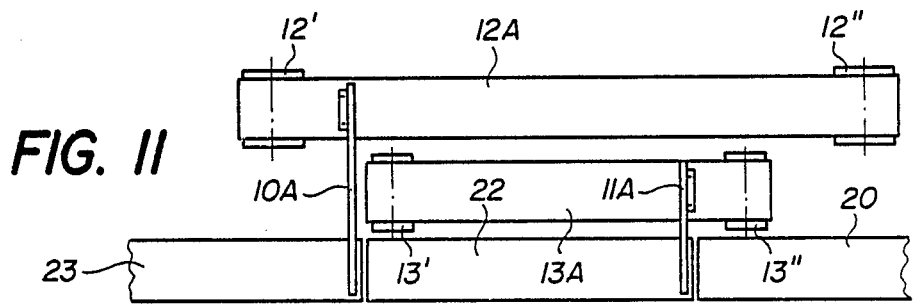
Figure 12:
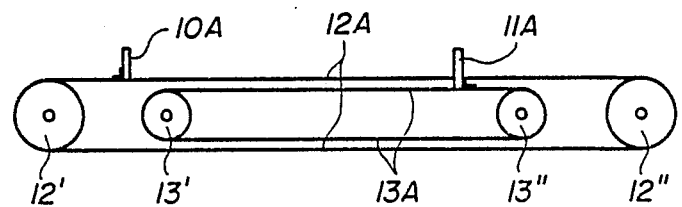

FIGS. 3 to 6 illustrate four successive phases of the operating process of the device illustrated in FIGS. 1 and 2, FIGS. 7 to 10 represent four distinct views illustrating four successive phases of the operating process of a variant of the device of the preceding figures, and FIGS. 11 and 12 represent two views, respectively in plan and in elevation, of a variant of the device according to the invention.

Figure 1:
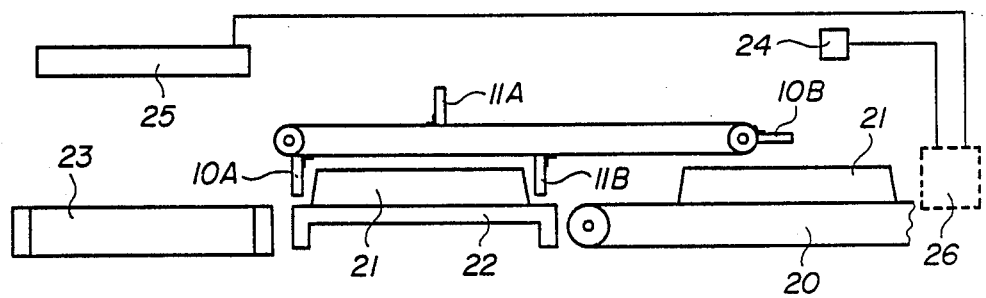
FIG. 1 represents a schematic elevation view of a first embodiment of the device according to the invention.
Figure 2:
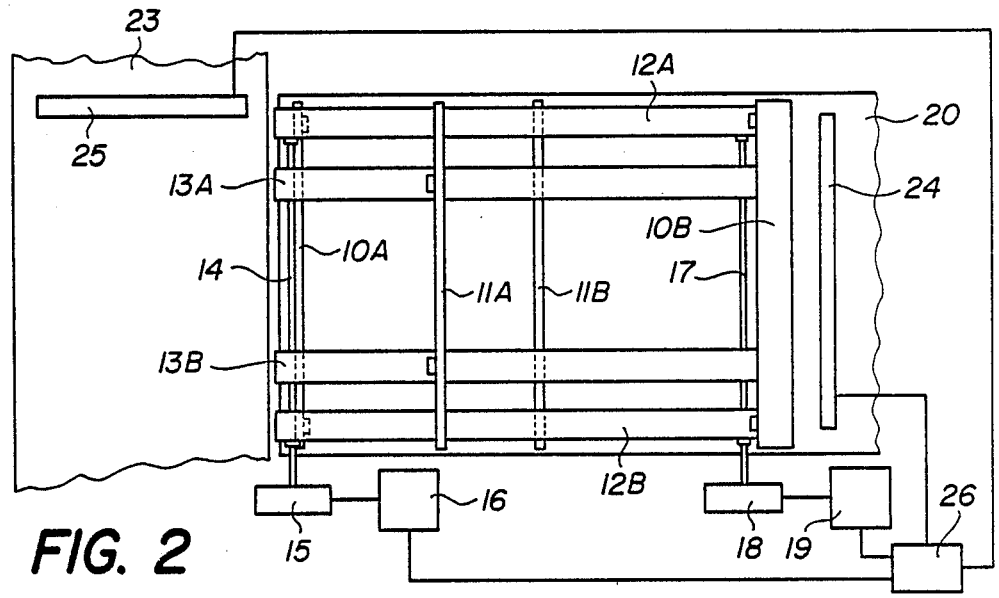
FIG. 2 represents a plan view from the top of the device according to FIG. 1.

With reference to FIGS. 1 and 2, the represented device comprises two pairs of pushers, 10A and 10B and 11A and 11B respectively, mounted transversely on two pairs of chains 12A, 12B and 13A, 13B parallel with each other. These chains which constitute said endless flexible members forming a closed loop could be replaced by belts or any other appropriate element. As is shown in the figures, the pushers 10A and 10B, offset with respect to one another in the longitudinal direction of the endless flexible members, are solid with the chains 13A and 13B. The pushers 11A and 11B, likewise offset along the chains, are solid with the endless flexible members 12A and 12B.

It will likewise be noted that the chains 13A and 13B are disposed in parallel position between the chains 12A and 12B. The chains 12A and 12B are driven in synchronism by a drive mechanism schematically represented by a drive axle 14, a driving wheel 15 and a driving motor 16. The chains 13A and 13B are likewise driven in synchronism by a drive mechanism schematically represented by a drive axle 17, a driving wheel 18 and a driving motor 19.

First detection means 24 are mounted above or on the endless conveyor 20 to deliver a signal relating to the arrival of the products or group of products, and second detection means 25 are mounted above or on the receiving surface 23 to deliver a signal relating to the departure of the products or groups of products from this surface.

These signals are collected by a central processing unit 26 which is connected to the driving motors 16 and 19, and constitutes said control means for controlling the drive mechanisms of the pushers.

This transfer device which is the subject of the present invention is associated with a conveyor 20 for supplying products 21, an intermediate support 22 and a receiving surface 23. In the example represented, the intermediate support 22 consists of a fixed plate. It might likewise consist of an endless transporter. The receiving surface 23 moreover consists in this case of a transverse belt conveyor serving to carry away the products 21 according to a direction perpendicular to the displacement of the products on the conveyor, these products being brought in rows by the conveyor and deposited, in a first phase, on the intermediate belt conveyor.

The receiving surface 23 may consist of a belt conveyor disposed substantially in the prologation of the conveyor 20.

Moreover, to ensure setting the pace of the products, the conveyor assembly 20, intermediate support 22 and receiving surface 23 may consist of a single endless belt conveyor, or of two belt conveyors which are displaced at different speeds. In this case, the intermediate support is a zone of the first belt conveyor and the receiving surface may be a zone of the first belt conveyor or of the second belt conveyor which is displaced at a higher speed than the first one.

The pushers 10A, 10B, 11A, and 11B have a twofold function. The first function consists in serving as a support stop for the products brought forward by the conveyor or displaced on the intermediate support. The second function consists in driving the products from the conveyor 20 onto the intermediate support 22 and from this intermediate support onto the transverse belt 23.

In practice, when a product or a row of products 21 is brought forward onto the intermediate support 22, the pusher 10A lies in the position represented in FIG. 1. The product 21 is in standy-by position. If the intermediate support 22 is a fixed plate or tray, the pusher 10A does not in principle play its role as a stop. On the other hand, if this support is a mobile belt conveyor, the pusher 10A may constitute a stop to keep the product 21 standing by.

The pusher 11b is brought to stand-by position behind the product 21 which is itself standing by on the support 22.

When a signal relating to the departure of the preceding product from the receiving surface is transmitted, the pusher 10A is retracted and the pusher 11B drives the product 21 onto the receiving surface. This pusher then assumes the position which the pusher 10A previously occupied. The pusher 10B, which is coupled with the pusher 10A, comes to assume the position previously occupied by the pusher 11B to serve as a stop for the following product and then to drive the product 21 standing by onto the intermediate support.

Figure 3:
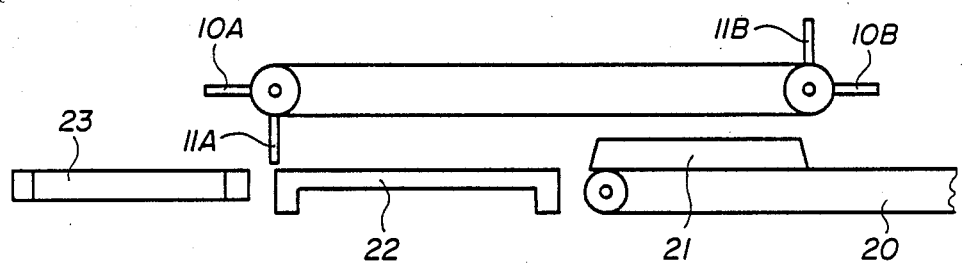

As is shown in FIG. 3, a row of products 21 is brought forward by the conveyor 20 to the extremity of the latter. The intermediate support 22, which constitutes a stand-by zone for receiving the products and storing them until the moment when the transversal band 23 has discharged its products, is once more available to receive a new series of products.

Figure 4:
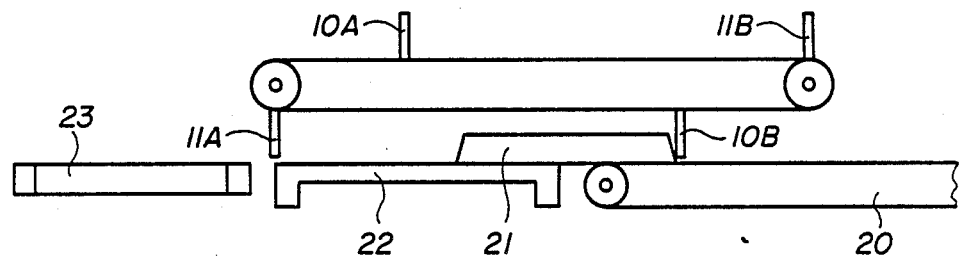
Figure 5:
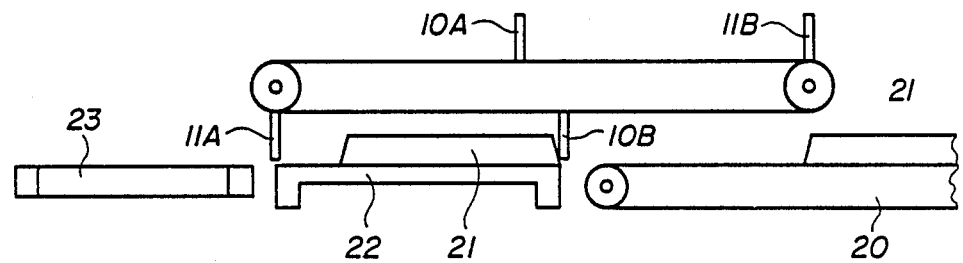

To effect the transfer of the products 21 from the conveyor 20 to the stand-by zone 22, the pusher 10B is utilized which is driven by the chains 13A and 13B. As is shown in FIG. 4, the pushers 10A and 10B, solid with the chains 13A and 13B, are driven by the latter while the pushers 11A and 11B, solid with the pushers 12A and 12B, are at standstill. The pusher 11A lies in position at the extremity of the stand-by zone 22 and thereby constitutes a stop against which the product 21 driven by the pusher 10B may be thrust. As is shown in FIG. 5, the pusher 10A is displaced at the same time as the pusher 10B while the pusher 11B has remained in the stand-by position to take up a new product 21 brought forward by the conveyor 20.

Figure 6:
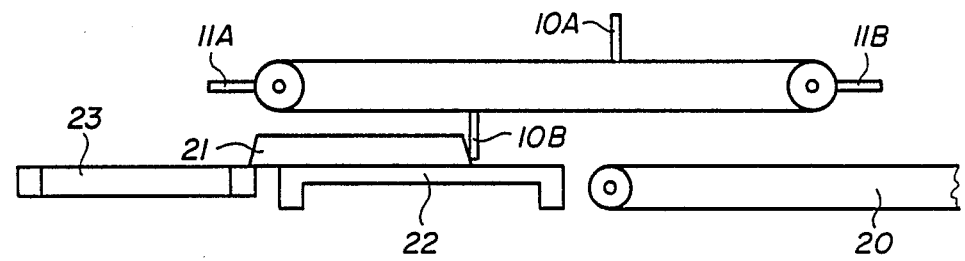
Figure 7:
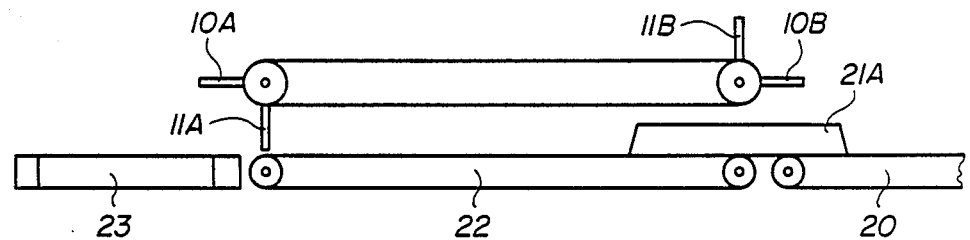

As soon as the receiving surface 23 is freed, the pusher 11A comes into the position represented in FIG. 6 so that the displacement of the product 21 is no longer prevented by the presence of a frontal stop. The pusher 10B starts to move again and effects the transfer of the product 21 from the stand-by zone 22 onto the receiving surface 23. The movement of the pushers 10B and 10A is stopped when the pusher 10B arrives at the extremity of the stand-by zone 22 to fill the function of a stop previously filled by the pusher 11A.

Given that the pushers 10 and the pushers 11 may be actuated independently from one another, the pusher 11B may effect the transfer of a new product 21 brought forward by the conveyor 20 before the stand-by zone 22 is discharged of the preceding product 21 driven by the pusher 10B. This device consequently allows simultaneous charging and discharging of the stand-by zone 22 to be ensured, which constitutes a considerable gain of time with respect to prior systems where the stand-by zone could not receive a new product unless the previously deposited product had been discharged.

In the example of the embodiment illustrated in the figures described above, the stand-by zone 22 has a length substantially equivalent to that of the product 21. Such a construction is not mandatory and the FIGS. 7 to 10 illustrate an embodiment in which the stand-by zone 22 has a length such that it may receive two successive rows of products brought forward by the conveyor.

Figure 8:
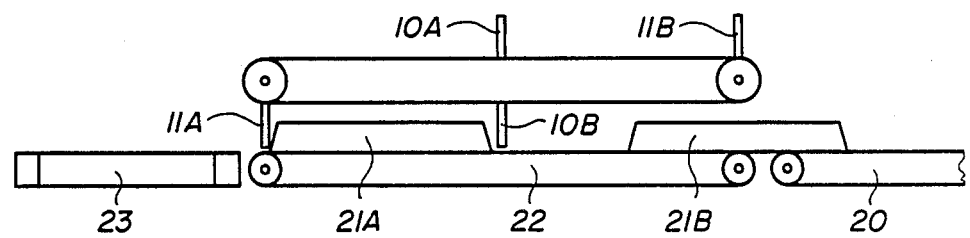
Figure 9:
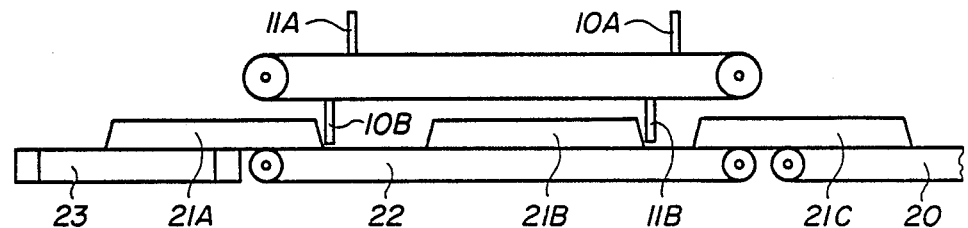

As before, the device includes two pushers 10A and 10B and two pushers 11A and 11B respectively driven by two pairs or chains 13A, 13B and 12A, 12B. In the course of a first phase illustrated in FIG. 7, a first product or row of products 21A is brought forward by the conveyor 20. This first row of products is, as is shown in FIG. 8, taken up by the pusher 10B and brought onto the plate or the intermediate belt conveyor constituting the stand-by zone 22 in abutment against the pusher 11A which is standing still. A second product or row of products 21B is brought forward by the conveyor 20. The second row of products is taken up by the pusher 11B. As soon as the receiving surface 23 is cleared, the pusher 10B starts to move again and ensures the transfer of the products 21A from the stand-by zone onto said receiving surface. Simultaneously the next products 21B, taken up by the pusher 11B, are brought to abut against the pusher 10B.

The pusher 11B likewise serves as a stop for the products 21C which have meanwhile been brought forward by the conveyor 20. As soon as the receiving surface 23 is cleared, the pusher 10B is freed and gives way for passage of the products 21B driven by the pusher 11B.

Figure 10:
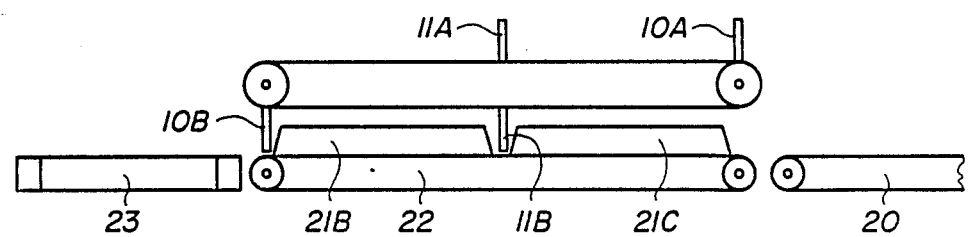

The products 21C are at this moment taken up by the pusher 10A and brought to abut against the pusher 11B which has assumed the position of the stop 10B such as represented in FIG. 10.

As before, it is noted that the charging and discharging phases may be operated simultaneously which solves the problem of loss of time due to the impossibility of simultaneously effecting these two phases of the process in the prior systems, and that for products or groups of products brought forward at irregular intervals.

FIGS. 11 and 12 represent a variant of the device comprising in this case two pushers 10A and 11A which are respectively linked to two control mechanisms each comprising a single flexible member 12A and 13A respectively. The pushers are made solid with the corresponding flexible members. The flexible member 12A, which is a belt for example, is tensioned between two axles 12' and 12". The flexible member 13A, which may likewise be a belt, is tensioned between two axles 13' and 13" which are parallel to the previous ones.

This device may be used to effect setting the pace of the products. It is quite evident that the axles might be coaxial two by two and that the belts might be duplicated depending on the applications.

The present invention is not limited to the described embodiments but may undergo different modifications and present itself in different variants obvious to one skilled in the art.

I claim:

1. A device for controlling the sliding transfer of product from an endless conveyor onto a receiving surface, said device comprising at least four pushers movable in the transport direction of the conveyor, two of said at least four pushers being respectively linked to one endless flexible member and being offset with respect to one another, in the direction of their displacement, and mounted transversely with respect to their endless flexible member, and the other two of said at least four pushers being respectively linked to a second endless flexible member and being offset with respect to one another, in the direction of their displacement, and mounted transversely with respect to their endless flexible member, both said flexible endless members forming a closed loop and being arranged for translational displacement while driving their respective pushers over at least a common section of the conveyor, the conveyor and the said receiving surface being disposed at substantially the same level whereby the said pushers slide the product from the conveyor to the receiving surface, and independent drive mechanisms respectively coupled with each said endless flexible member, first detection means arranged to deliver a signal relating to arrival of product on said conveyor, second detection means arranged to deliver a signal relating to departure of the product from said receiving surface, said first and second detection means being coupled with means for controlling said drive mechanisms, and said control means being designed to actuate both said drive mechanisms independently, as a function of said signals, in such a manner that the pushers are actuated independently of each other as a function of the arrival and the departure of the product at said conveyor and said receiving surface.

2. A device according to claim 1, wherein each endless flexible member comprises two parallel chains or bands and the chains or bands of one endless flexible member are disposed parallel to one another between the chains or bands of the other endless flexible member.

3. A device according to claim 2, wherein the two chains or bands of one of the endless flexible members are interconnected with one another by their respective two pushers which are arranged parallel to one another and the two chains or bands of the other endless flexible member are likewise connected to one another by their two respective pushers arranged parallel to one another.

4. A device according to claim 2, wherein the two chains or bands of one of the endless flexible members are tensioned between two parallel first axles, and the two chains or bands of the other endless flexible member are tensioned between two parallel second axles which are parallel to said first axles.

5. A device according to claim 4, wherein at least one of said first axles is coaxial with one of said second axles.

6. A device according to claim 1, wherein each endless flexible member comprises a chain or band which are disposed parallel to one another, and said conveyor and an intermediate support are disposed parallel with but laterally offset from said chains or bands.

7. A device according to claim 6, wherein the intermediate support is a fixed platform.

8. A device according to claim 6, wherein the intermediate support is an endless belt conveyor.

9. A device according to claim 6, wherein the intermediate support consists of an end section of the conveyor.

10. A method for controlling the sliding transfer of product from an endless conveyor onto a receiving surface, said method comprising steps of:
providing two pushers, in an offset relationship, on a first endless flexible member;
providing two pushers, in an offset relationship, on a second endless flexible member;
driving each endless flexible member with an independent drive mechanism;
arranging the endless flexible members so that translational displacement of the flexible members, by their associated drive mechanism, causes their respective pushers to pass over at least a common section of the conveyor, the conveyor and the said receiving surface being disposed at substantially the same level whereby the said pushers slide the product from the conveyor to the receiving surface;
detecting arrival of product on said conveyor;
detecting departure of product from said receiving surface;
controlling both said drive mechanisms in such a manner that the two pushers carried by one of the endless flexible members are actuated independently from the two pushers carried by the other endless flexible member as a function of arrival and departure of product at said conveyor and said receiving means to control the transfer of product from the conveyor to the receiving surface.

11. A device for controlling the sliding transfer of product from an endless conveyor onto a receiving surface means, said receiving surface means including a first portion and a second portion, said device comprising at least two pushers movable in the transport direction of the conveyor, each one of said two pushers being respectively connected to a separate endless flexible member, forming a closed loop, and each arranged for a translational displacement while driving its associated pusher over at least a common section of said conveyor, the conveyor and the said receiving surface means being disposed at substantially the same level whereby the said pushers slide the product from the conveyor to the receiving surface means, an independent drive mechanism coupled with each said endless flexible member, first detection means arranged to deliver a signal relating to arrival of product on said conveyor, second detection means arranged to deliver a signal relating to departure of the product from said second portion of said receiving surface means, said first and second detection means being coupled with means for controlling said drive mechanisms, said control means being designed to actuate said drive mechanisms independently, as a function of said signals, in such a manner that said pushers are actuated independently of each other as a function of the arrival and the departure of the product at said conveyor and said receiving surface means,
wherein, when the device is in use, a pusher, carried by one of the endless flexible members, is located immediately adjacent and between said first and second portions of said receiving surface means and functions as a stop for preventing movement of the product onto the second portion of said receiving surface means until such product movement is desired.

* * * * *